United States Patent [19]

Granzow et al.

[11] Patent Number: 5,123,706
[45] Date of Patent: Jun. 23, 1992

[54] AUTOMOBILE SEAT WITH A BACKREST FRAME

[75] Inventors: Manfred Granzow, Dörentrup; Hans-Peter Mischer, Horn-Bad Meinberg; Christian Süss, Bad Salzuflen, all of Fed. Rep. of Germany

[73] Assignee: Gebr. Isringhausen, Lemgo, Fed. Rep. of Germany

[21] Appl. No.: 460,944

[22] PCT Filed: Jun. 20, 1989

[86] PCT No.: PCT/EP89/00692
§ 371 Date: Apr. 23, 1990
§ 102(e) Date: Apr. 23, 1990

[87] PCT Pub. No.: WO89/12563
PCT Pub. Date: Dec. 28, 1989

[30] Foreign Application Priority Data

Jun. 22, 1988 [DE] Fed. Rep. of Germany ....... 3821554

[51] Int. Cl.⁵ ................................................. A47C 7/02
[52] U.S. Cl. ..................................... 297/452; 297/355; 297/460
[58] Field of Search ............... 297/452, 284, 355, 460, 297/377, 361, 284 R; 248/429, 420

[56] References Cited

U.S. PATENT DOCUMENTS 2,998,281  8/1961  Stoner et al. ................... 297/374
3,079,118  2/1963  Pickles ............................ 248/420
4,585,273  4/1986  Higgs et al. ..................... 297/452

FOREIGN PATENT DOCUMENTS 2126476  3/1984  United Kingdom ............ 297/361

Primary Examiner—Kenneth J. Dorner
Assistant Examiner—Milton Nelson, Jr.
Attorney, Agent, or Firm—Salter, Michaelson & Benson

[57] ABSTRACT

An automobile seat includes seat frame and backrest frame portions, each of which includes a pair of opposite side braces of generally U-shaped configuration which face away from the seating surfaces of their respective side frame and back rest frame portions. The side braces of the side frame and back frame portions define open channel-like areas for accommodating adjusting units of the seat.

3 Claims, 2 Drawing Sheets

AUTOMOBILE SEAT WITH A BACKREST FRAME

BACKGROUND AND SUMMARY OF THE INVENTION

This invention relates to an automobile seat with a backrest frame and/or a seat frame, each of which has open side braces placed laterally and essentially U-shaped in cross section.

Frame constructions with side brace hollow profiles open on one side are known. They are used primarily with small thicknesses to reduce weight. Of course, special measures are necessary to make such side brace hollow profiles rugged and torsionally rigid. This applies particularly to the side braces of backrest frames, to the top of which a safety belt may also be fastened.

As measures for achieving the desired load capacity and torsional rigidity of the side braces, it is known how to give side braces, generally made of rod material, a special cross sectional profile, which can be symmetrically C-shaped, U-shaped, or Z-shaped for example. It is also known how to arrange the side braces of backrest frames so that the axis of the largest moment of resistance points approximately in the direction of action of the safety belt, i.e., diagonally to the long direction of the seat (cf. DE-OS 36 24 295). However, this then results in a larger structural volume for the backrest which is inherently desired to be particularly flat, and a smaller moment of resistance in the direction of the forces acting approximately perpendicular to the backrest that are especially large in the area of linkage of the backrest frame to the seat bottom and/or to the seat frame.

It is the purpose of this invention to propose a design for the side braces of the backrest frame and/or of the seat frame that can absorb high forces from all important directions of application, and at the same time is torsionally rigid and nevertheless does not require a larger structural volume for the seat, and particularly not for the backrest desired to be of flat design.

This problem is solved pursuant to the invention by the fact that the open side of the side braces extends away from the top of the seat used by the passenger and that the back of the side braces facing the passenger has such a large width, at least in some areas, that structural adjusting units for the seat can be placed in the cavity enclosed by the side braces, i.e., in the inner profile space of the side braces. It is desirable to provide that the adjusting units located in the profile space are fastened to both side walls of the side brace.

Particularly beneficial side braces pursuant to the invention also have a diagonal surface that is placed at the center of the seat, and a side brace back width that changes relative to the backrest frame, which decreases essentially conforming to the outer contour of the backrest starting from the bottom of the side braces toward the head of the backrest frame.

With regard to the backrest frame, it is beneficial also to modify the structural depth of the side braces, specifically increasing toward the bottom of the side braces. At this bottom end of the side braces, i.e., at their base, the pivot axis is then shifted forward toward the passenger for the tilt adjustment of the backrest, i.e., it is located next to the back of the side braces. On the other hand, the linkage points of the tilt adjusting mechanism are then to be positioned on the side braces toward the rear, i.e., away from the passenger next to the open side of the side braces. This results in a particularly effective linkage of the side braces of the backrest frame to the seat bottom or the seat frame that can handle all forces properly.

As a result, the construction pursuant to the invention provides that the side braces have a wide back profile with a wide inner profile space to hold adjusting units for the seat, and at the same time because of the diagonal surfaces designed in them and because of a certain outer contour shape, and also because of the mentioned structural depth modification toward the deep and wide base of the side braces, they constitute a polyhedral object that can absorb large forces from all important directions of application with torsional rigidity.

The placement of the adjusting units for the seat in the inner profile spaces makes it possible for the structural volume of the seat to remain small in the desired manner. This applies particularly to the desired flat design of the backrest, which undergoes no enlargement of the backrest thickness in the particularly critical central area of the backrest because of the integrated placement of the backrest adjusting units in the cavity of the side braces on the outside and at the side.

An additional extreme reinforcement of the side brace hollow profile is achieved at the same time by the integrated placement of the adjusting units for the seat, for example a latching unit, an adjusting motor, or the like, in the inner profile space of the side braces, and the simultaneous fastening of the adjusting units to both side walls of the side brace.

Nevertheless, the large back widths of the side braces necessary for the utilization of the inner profile space do not interfere with seat comfort, since the backs of the side braces have a diagonal surface located at the center of the seat that brackets the backrest and/or the seat surface for the body of the passenger and at the same time supports the body of the passenger on the side.

The "polyhedral object" described above as a side brace for automobile seats is a new design principle that intentionally avoids the use of extruded, canted, or rolled bar profiles for the side braces of backrest frames and/or seat frames. Nevertheless, the polyhedral object can be manufactured economically from sheet metal by means of a form tool, for which the light construction can be taken into account by appropriate optimization of the sheet thicknesses.

With regard to the side braces of a seat frame, a desirable refinement of the invention provides that a second brace (called the bottom brace below) is arranged beneath each of the side braces of the seat frame with U-shaped cross section open at the top, and that the side braces are adjustable relative to their bottom braces by adjusting units that are located in the cavity enclosed by the side braces.

It is particularly desirable for the side braces to overlap the bottom braces with each outer side wall. The bottom profile can be almost completely covered over by this, and the side wall of the side brace drawn downward can advantageously be used for the attachment of handles or other manual operating devices, without the risk that the hand of the passenger will get between the side brace and the bottom brace.

DESCRIPTION OF THE DRAWINGS

An example of embodiment of the invention will described in detail below with reference to the drawings. The drawings show.

DESCRIPTION OF THE INVENTION

Figure 1:
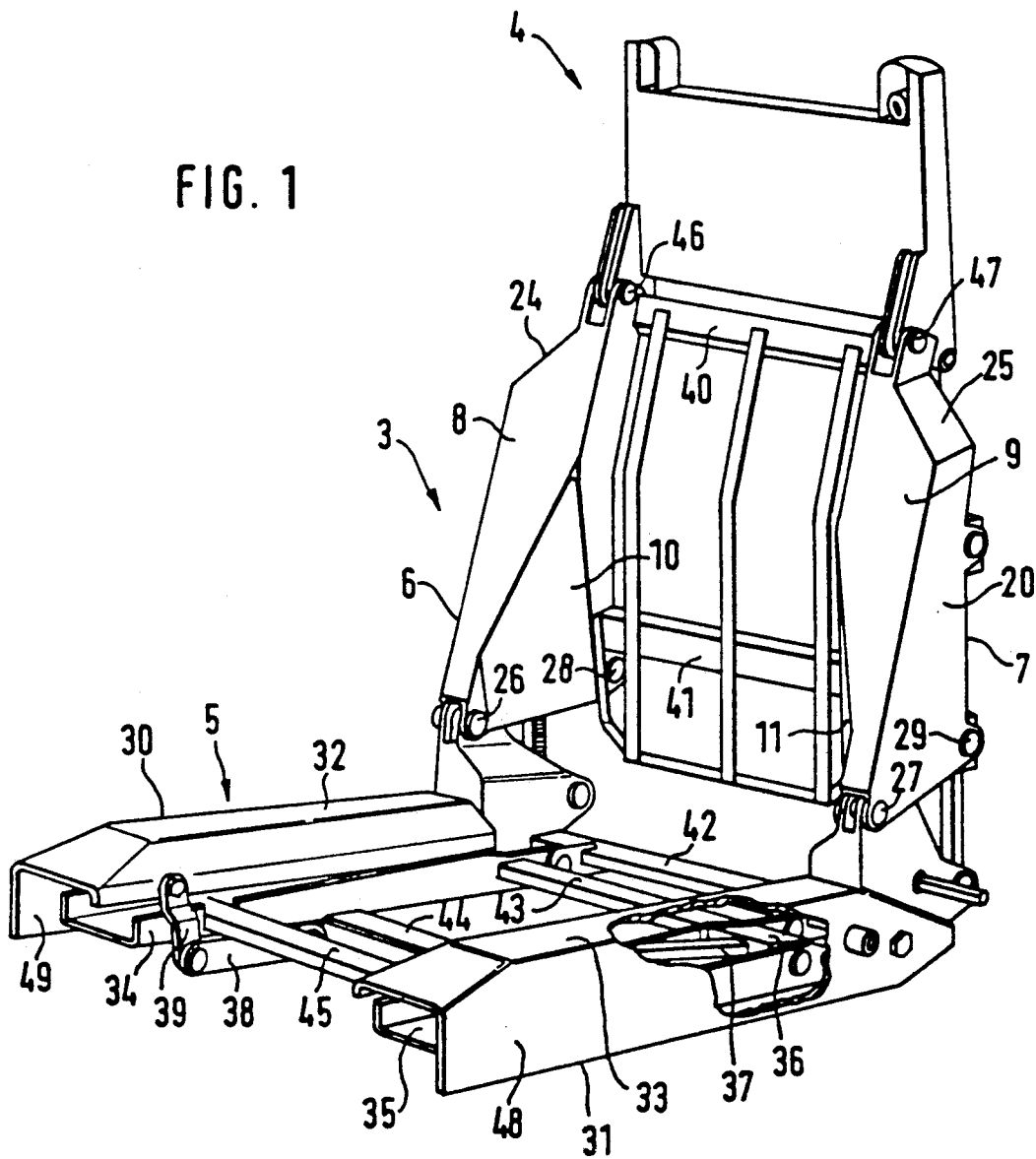
FIG. 1 illustration in perspective diagonally from the front of an automobile seat pursuant to the invention.
Figure 2:
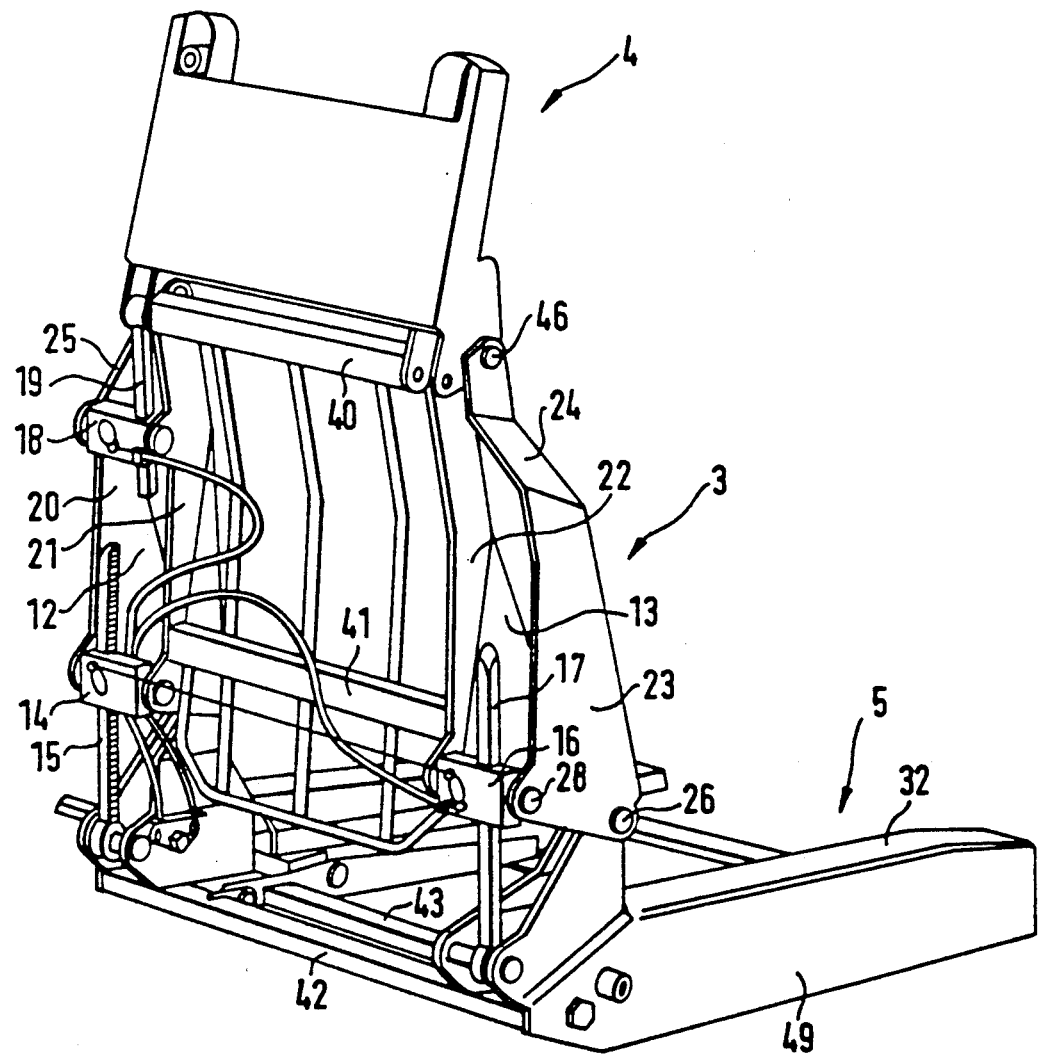
FIG. 2 the seat of FIG. 1 diagonally from the back.

The automobile seat illustrated shows the metal construction without cushion parts or cover. It consists essentially a backrest frame 3 with adjustable head part 4 and a seat frame 5.

The backrest frame 3 has two side braces 6 and 7, each of which has a wide, front wall or closed back 8 and 9 with a diagonal surface 10 and 11 positioned sloping toward the center of the seat.

This produces an inner profile space 12 and 13 accessible from the rear that can be utilized for the integrated placement of structural adjusting units for the seat in the profile space.

In the example of embodiment illustrated, there are adjusting units in the form of rod and clamp devices 14, 15 or 16, 17 or 18, 19 in the inner profile space. It can be seen that each of the clamping devices is fastened at both ends, i.e., to both side walls 20, 21 or 22, 23 of the side braces and thus provide additional reinforcement for the side braces 6 and 7.

The outer side walls 20 and 23 of the side braces 6 and 7 are provided with shoulder surfaces 24 and 25 corresponding to the outer contour of the backrest, and as best seen in the outer lateral surfaces 20 and 23, the structural depth of the side braces 6 and 7 measured between the back and the open side increases toward the bottom of the side braces.

As a result, the illustrated side braces 6 and 7 are thus a "polyhedral body", each of whose individual surfaces (specifically the back surface 8, 9, the diagonal surfaces 10, 11, the side walls 20, 21 or 22, 23, and the shoulder surfaces 24, 25) has its own arrangement in space that differs from the others, so that side braces are formed with extremely high torsional rigidity that can absorb large forces from all important directions of application. The pivot axes 26 and 27 for the tilt adjustment of the backrest are located at the bottom of the side braces 6 and 7 next to the particular back surfaces 8 and 9 of the side braces. These pivot axes are intentionally displaced forward toward the passenger and act together with the pivot axes 28 and 29 displaced toward the back, which serve for the linkage or fastening of the rod and clamp devices 14 and 16 to the side braces. Thus, the axes 26, 27 and 28, 29 at the bottom base of the side braces are relatively far apart and the forces can be particularly well transmitted through the side braces 6 and 7 to the seat bottom, or as in the case illustrated, to the seat frame.

The seat frame also has side braces 30 and 31 that have a wide back surface 32 and 33 so that structural adjusting units for the seat can be placed in the cavity enclosed by the side braces, i.e., in their inner profile space.

In the example of embodiment illustrated, a bottom brace 34 and 35 is placed below each of the side braces 30 and 31 of the seat frame, which enclose a cavity with the side braces in which is located the rod and clamp unit 36, 37. This rod and clamp unit is used to spread apart in the vertical direction the front ends of the side braces 30, 31 from the bottom braces 34, 35 by means of the connecting rods 38, 39 to make possible a simple tilt adjustment of the seat frame 5 relative to the bottom braces.

The side braces of both the backrest frame and the seat frame are connected to one another in the usual way by cross-struts 40-45. Other transverse connectors can also be used instead of such cross-struts, for example in the form of cross-plates.

A head part 4 that can pivot around the axes 46 and 47 is fastened to the top of the backrest frame 3, which is adjustable in its slope relative to the backrest frame 3 by means of the rod and clamp unit 18, 19. This rod and clamp unit is placed inside the inner profile space of the side brace of the backrest frame, so that it requires no additional installation volume and is kept away from all cushioning materials of the seat (not shown) for its functionability.

The basic operating structure of all of the rod and clamp units mentioned above is known from DE-OS 34 20 103, and is operated by means of Bowden cables whose actuating devices (not shown) are fastened to one of the outer side walls 48 or 49 of the side braces 30, 31 of the seat frame 5, which essentially completely overlap the bottom braces 34, 35 from the outside, so that no risk of injury exists in manipulating the operating mechanisms of the Bowden cables.

We claim:

1. In an automobile seat of a type including a backrest frame including a pair of opposite side braces, each of said side braces being of elongated, open, generally U-shaped channel-like configuration and including a front wall having a length and a width, and spaced inner and outer side walls, each of said side braces defining an open interior cavity, an improvement comprising the side braces of said backrest frame being positioned such that the front walls thereof face forwardly and such that the interior cavities thereof open rearwardly, and seat adjusting means in said open interior cavities, the widths of said front walls being sufficient to accommodate said seat adjusting means in the open interior cavities in said side braces, the side braces of said backrest frame further including diagonal walls which extend angularly inwardly and rearwardly from the respective front walls thereof to portions of the respective inner side walls thereof.

2. In the automobile seat of claim 1, the widths of the side braces of said backrest frame having upwardly decreasing widths extents, the side braces of said backrest frame substantially defining an outer contour of said backrest.

3. In the automobile seat of claim 1, the side braces of said backrest frame having open rear sides, having the side braces of said backrest frame downwardly increasing structural depths as defined by the distances between the open rear sides thereof and the respective front walls thereof, said adjusting means being pivotally attached to each of the side braces of said backrest frame at a point which is adjacent the lower end of and also adjacent the open rear side of the respective side brace of said backrest frame.

* * * * *